Feb. 6, 1940.   C. A. CAMPBELL   2,189,704
FILTER
Filed Feb. 18, 1938
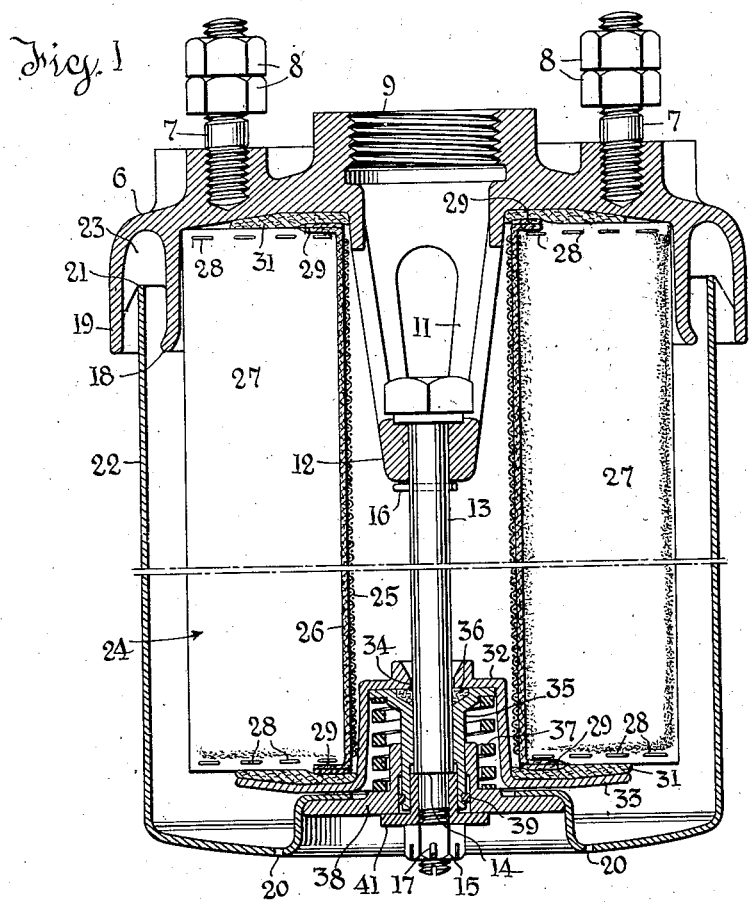
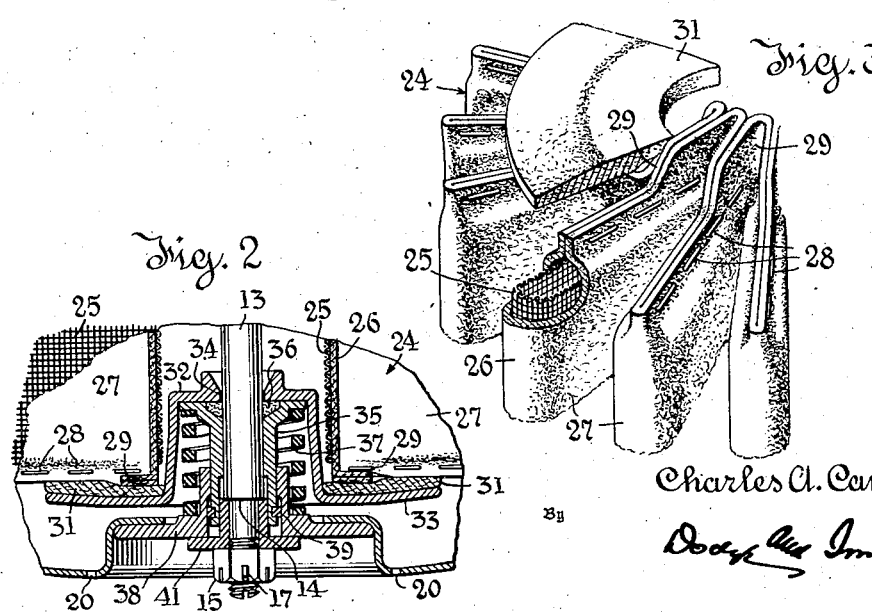
Inventor
Charles A. Campbell
Attorneys Patented Feb. 6, 1940

2,189,704

UNITED STATES PATENT OFFICE 2,189,704

FILTER

Charles A. Campbell, Watertown, N. Y., assignor to The New York Air Brake Company, a corporation of New Jersey Application February 18, 1938, Serial No. 191,324

7 Claims. (Cl. 183—71)

This invention relates to filters. The form shown is designed primarily to be used on air pumps to clean the air being drawn through the pump intake. Other adaptations of the device, however, may be resorted to.

Filters employing a filter insert of the general type here shown, i. e. zig-zag in cross section, are known and no claim is here made thereto.

Filters of this type have not heretofore proved satisfactory due in part to faulty design. For instance, the use of narrow felt sealing washers at either end of the insert, restricted the end compression load to a relatively small area. This caused the wire screen or foraminous reinforcing element of the filter insert to break down and spread apart at either end with consequent chafing and excess wear.

As the insert spread, its overall length was considerably shortened. This permitted it to work loose and finally resulted in objectionable leakage past the filter.

The present invention overcomes these difficulties and provides a filter element which includes end sealing washers of an area substantially coextensive with the insert end which it engages.

The filter insert and the end sealing washers are supported and constantly urged into intimate contact within the filter housing by spring means thus reducing to a minimum probability of relative displacement of the various elements.

In the following specification the invention will be described in detail and illustrated in the accompanying drawing in which:

Fig. 1 is an axial section view of a filter device constructed in accordance with this invention.

Fig. 2 is a fragmentary view of the lower portion of Fig. 1.

Fig. 3 is a perspective view of a portion of one end of the filter insert or body.

Referring now to the drawing, the numeral 6 designates the head portion of the filter unit. It is circular in form and is provided with studs 7, nuts 8, and a central threaded opening 9 by means of which the unit may be attached to the intake connection of an air pump (not shown).

Inwardly of threaded opening 9 a pendant yoke 11 formed as a part of head 6 supports a hub 12 which in turn receives and supports a retaining bolt or pin 13. Bolt 13 is shouldered at 14 and threaded at its end to receive a castellated nut 15. Cotter pins 16 and 17 are provided as shown to lock the retaining bolt 13 and the nut 15 in their assembled position.

Radially spaced flanges 18 and 19 formed about the periphery of the head 6 provide a channel which receives the rim 21 of a cup-shaped shell 22. When in assembled position shell 22 is held in spaced relation to the bottom and side walls of said channel by an annular series of spaced radial webs or lugs 23. This permits air to flow over the rim 21 to the interior thereof, and is effective to exclude water, cinders, and other foreign matter. Drain holes 20 are provided in shell 22 to carry off any condensate or other moisture which for any reason may be present therein.

Within the shell 22 is positioned a filtering element or insert 24 of generally annular form having an axially-extending, open-ended passage therethrough (see particularly Figs. 1 and 3). It is made up of a strip of wire screen 25 and a strip of fabric 26 of approximately equal lengths superposed and together folded longitudinally in zig-zag form to produce a plurality of flat radially extending hollow vanes 27. The edges of the fabric extend beyond the edges of the wire screen and are stapled together as clearly shown at 28. At the ends of its inner longitudinal folds the edge of the fabric, as shown in Fig. 3, is provided with tabs or ears 29 each of which forms an extension of the fabric of a pair of adjoining vanes 27 and is initially folded in line with the longitudinal inner fold of its pair of vanes. Tabs 29 are then bent or lapped over, one upon the other, in an annular series and stitched in place with thread, the tabs serving, when the device is assembled, to prevent leakage at the ends of the junctions of the vanes 27. Fig. 3 indicates this, in part, with an end gasket in place over the folded down tabs, and also, in part, with the gasket broken away and certain of the tabs 29 in their initial upright position.

Both the upper and lower ends of the annular filter insert are formed as above described and both ends are provided with annular sealing gaskets 31 of fabric which are of an area approximating that of the ends of the insert.

The filter insert 24 when assembled is positioned at its upper end, for coacting with its annular seat on head 6, by the tapered boss 12 and yoke 11 of the head 6. At its lower end it is positioned and yieldably supported by means which will now be described.

A follower 32 is formed with a circular flange 33 which in assembled position engages the sealing gasket 31 and is coextensive therewith.

The retaining bolt 13 projects through an opening 34 in follower 32 and receives a combined spring seat and packing gland 35 positioned within said follower. Packing 36 prevents air flow around either the spring seat 35 or the retaining bolt 13. A coil spring 37 is interposed between spring seat 35 and a second spring seat 38, which is slidably mounted upon an extension of spring seat 35. Outward motion thereupon is limited by a snap ring 39 which is seated in a groove.

A flanged spacer 41 is received upon the lower end of the retaining bolt 13 and engages the lower face of spring seat 38. Spring seat 38 engages the shell 22 as well as the spring 37 and as the nut 15 is screwed home the shell 22 will be moved to its seat in head 6 and firmly clamped in position. Similarly, the coil spring 37 will be compressed and to a degree limited by engagement of spacer 41 with the shoulder 14. The resulting stress on this spring is then sufficient to support and maintain the filter insert 24 in position and cannot be unduly increased.

It will be observed that in Fig. 1 of the drawing the spring 37 is stressed the maximum degree whereas in Fig. 2 it has been assumed that some degree of wear or compression of the insert has occurred and the spring 37 has expanded somewhat, the follower 32 moving to maintain its contact with and support of the insert 24.

It is also to be noted that as the end sealing gaskets 31 are forced against the insert ends, the tabs or ears 29 will tend to bite into the washers and thus inhibit radial displacement of the vanes of the insert.

While the invention has been described in some detail no necessary limitation thereto is implied, modifications within the scope of the appended claims being contemplated.

What is claimed is:

1. The combination of a filter body of generally annular form having a longitudinally extending passage open at its ends, said body comprising a plurality of flat, radially-disposed, longitudinally-extending hollow vanes communicating with said passage in the body and formed by a zigzag-folded, foraminous framework and a fabric cover sustained thereby and conforming thereto, said fabric cover completely covering the exterior of the filter body, including the ends of the vanes, the cover fabric on each pair of adjoining vanes, at both ends of the filter body, being further extended over a portion of the end adjacent the junction of said vanes to form a radially-disposed tab folded in prolongation of the inner fold of said pair of vanes, said folded tabs also being folded towards said body to provide an annular overlapping series of tabs at each end of the body; annular sealing gaskets in engagement with the ends of said body, including said tabs; a head portion having an air connection and an annular seat for one of said gaskets surrounding said connection; and means, carried by the head portion, closing the opposite end of the passage in said body and having an annular surface engaging the other of said gaskets to clamp said gaskets, filter body and seat together in close sealing engagement.

2. The combination of a filter body of generally annular form having a longitudinally extending passage open at its ends, said body comprising a plurality of flat, radially-disposed, longitudinally-extending hollow vanes communicating with said passage in the body and formed by a foraminous framework and a fabric covering sustained thereby; annular sealing gaskets in engagement with the ends of said body; a head portion having an annular seat for one of said gaskets; a centrally positioned, pendant yoke located on said head portion and within the passage in the filter body; a retaining pin carried by said yoke; a follower, encircling said pin, engaging the other of said gaskets and closing the corresponding end of the passage in said filter body, said gaskets being approximately coextensive with said seat and said follower and of sufficient area so that they engage large portions, at least, of the ends of the filter body; a compression spring on said pin for constantly urging said follower towards said seat to clamp said follower, filter body, gaskets and annular seat in firm sealing engagement with each other, said follower being movable towards said annular seat, upon longitudinal shortening of the filter body and gasket assembly, to maintain said sealing engagement; removable means on said pin for holding the spring under compression; and means for establishing an air connection within the said seat to the passage in said filter body.

3. The combination of a filter body of generally annular form having a longitudinally extending passage open at its ends, said body comprising a plurality of flat, radially-disposed, longitudinally-extending hollow vanes communicating with said passage in the body and formed by a foraminous framework and a fabric covering sustained thereby; annular sealing gaskets in engagement with the ends of said body; a head portion having an annular seat for one of said gaskets; a centrally positioned, pendant yoke located on said head portion and within the passage in the filter body; a retaining bolt carried by said yoke, a follower, encircling said bolt, engaging the other of said gaskets and closing the corresponding end of the passage in said filter body, said gaskets being approximately coextensive with said seat and said follower; packing means for preventing leakage between said follower and bolt; a compression spring on said bolt for constantly urging said follower toward said seat to clamp said follower, filter body, gaskets and annular seat in firm sealing engagement with each other, said follower being movable towards said annular seat, upon longitudinal shortening of the filter body and gasket assembly, to maintain said sealing engagement; means threaded on said bolt for compressing said spring; and means for establishing an air connection within said seat to the passage in said filter body.

4. The combination of a substantially rigid filter body, said body being of generally annular form and having a longitudinally-extending passage open at its ends; annular sealing gaskets in engagement with the ends of said filter body; a head portion having an air connection and an annular seat for one of said gaskets surrounding said connection; supporting means on said head portion; a follower, movably mounted on said supporting means, closing the opposite end of the passage in said body and having an annular surface engaging the other of said gaskets; and resilient means on said supporting means for constantly urging the follower towards said seat to clamp said follower, filter body, gaskets and seat together in close sealing relation, said follower being movable towards said seat, upon longitudinal shortening of the filter body and gasket assembly, to maintain said sealing relation of the parts.

5. The combination of a substantially rigid filter body of generally annular form having a longitudinally-extending passage open at its ends, said body comprising a plurality of flat, radially-disposed, longitudinally-extending hollow vanes communicating with said passage in the body and formed by a wire screen framework and a fabric cover sustained thereby and conforming thereto, said fabric cover completely covering the exterior of the filter body, including the ends of the vanes; relatively wide, annular sealing gaskets in engagement with the ends of said filter body; a head portion having an air connection and an annular seat for one of said gaskets surrounding said connection; supporting means on said head portion extending through said passage in the filter body; a follower, slidably mounted on said supporting means, closing the opposite end of the passage in said body and having an annular surface engaging the other of said gaskets; and a spring mounted under compression on said supporting means for constantly urging the follower towards said annular seat to clamp said follower, filter body, gaskets and seat together in tight sealing engagement, the follower being movable towards said seat, upon longitudinal shortening of the filter body and gasket assembly, to maintain said sealing engagement of the parts, while each of said gaskets has sufficient area so that it engages at least a major portion of the area of the adjoining end of the filter body, the annular seat and its gasket are coextensive, and said annular surface on the follower and its gasket are coextensive.

6. The combination of a filter body of generally annular form having a longitudinally-extending passage open at its ends and longitudinally-extending, hollow fins radiating from and communicating with said passage, said body comprising a foraminous reinforcing element and a fabric covering sustained thereby; a mount having an air connection and an annular seat surrounding the same to receive one end of said body and coact with substantial portions of the ends of said fins whereby said connection communicates with the interior of the body only; a follower for closing the other end of the passage in said body and coacting with substantial portions of the other ends of said fins; annular sealing gaskets interposed between opposite ends of said filter body and said seat and follower respectively, said gaskets being substantially coextensive with said seat and said follower; resilient means for constantly urging said follower toward said seat to clamp said follower, filter body, gaskets and annular seat in firm sealing engagement with each other, said follower being movable towards said annular seat, upon longitudinal shortening of the filter body and gasket assembly, to maintain said sealing engagement; means for stressing said resilient means; and means for limiting the stress so developed.

7. The combination of a filter body of generally annular form having a longitudinally-extending passage open at its ends and longitudinally-extending hollow fins radiating from and communicating with said passage, said body comprising a foraminous reinforcing element and a fabric covering sustained thereby; a mount having an annular series of lugs, an air connection and an annular seat surrounding the same to receive one end of said body and coact with substantial portions of the ends of said fins whereby said connection communicates with the interior of the body only; supporting means on said mount; a follower, movably mounted on said supporting means, for closing the other end of the passage in said body and coacting with substantial portions of the other ends of said fins; annular sealing gaskets interposed between opposite ends of said filter body and said seat and follower respectively, said gaskets being substantially coextensive with said seat and said follower; resilient means on said supporting means for constantly urging said follower toward said seat to clamp said follower, filter body, gaskets and annular seat in firm sealing engagement with each other, said follower being movable towards said annular seat, upon longitudinal shortening of the filter body and gasket assembly, to maintain said sealing engagement; and a cup-shaped shell sustained by said supporting means with its rim engaging said lugs, said shell serving to enclose and protect said filter body while affording air passages to the exterior thereof between said lugs.

CHARLES A. CAMPBELL.